US011452033B2

(12) United States Patent
Novoa et al.

(10) Patent No.: US 11,452,033 B2
(45) Date of Patent: Sep. 20, 2022

(54) VARIABLE WIRELESS BEACONING BASED ON SYSTEM CONTEXT

(71) Applicant: DELL PRODUCTS, LP, Round Rock, TX (US)

(72) Inventors: Manuel Novoa, Leander, TX (US); Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/183,613

(22) Filed: Feb. 24, 2021

(65) Prior Publication Data
US 2022/0272616 A1   Aug. 25, 2022

(51) Int. Cl.
*H04W 76/10*   (2018.01)
*H04W 48/16*   (2009.01)
*H04W 88/06*   (2009.01)

(52) U.S. Cl.
CPC ............ *H04W 48/16* (2013.01); *H04W 88/06* (2013.01)

(58) Field of Classification Search
CPC ..... H04W 48/16; H04W 88/06; H04W 76/10; H04B 3/544; H04B 7/18558; H04B 7/264; H04B 7/2659
See application file for complete search history.

(56) References Cited

U.S. PATENT DOCUMENTS

| | | | |
|---|---|---|---|
| 9,900,919 B1* | 2/2018 | Butler | H04W 52/0229 |
| 10,939,500 B1* | 3/2021 | Kiraly | H04W 68/00 |
| 11,165,614 B1* | 11/2021 | Srinivasa | H04L 27/2603 |
| 11,330,508 B1* | 5/2022 | McKeefery | H04W 24/08 |
| 2016/0342979 A1 | 11/2016 | Joshi et al. | |
| 2017/0222366 A1* | 8/2017 | Gee | H01R 13/6397 |
| 2018/0239444 A1* | 8/2018 | Siddiqui | G06F 1/3215 |
| 2018/0367177 A1* | 12/2018 | Ramasamy | H04B 1/126 |
| 2019/0036563 A1* | 1/2019 | Koshy | H04W 52/18 |
| 2019/0174261 A1 | 6/2019 | Kostka et al. | |
| 2020/0275369 A1* | 8/2020 | Foster | H04B 1/406 |
| 2021/0103329 A1* | 4/2021 | Gougeon | G06F 1/3206 |
| 2022/0086598 A1* | 3/2022 | Pettit | H04W 12/80 |

* cited by examiner

*Primary Examiner* — Andrew Wendell
(74) *Attorney, Agent, or Firm* — Larson Newman, LLP

(57) ABSTRACT

A processor determines whether an information handling system is in a first state and directs a wireless data communication interface to provide a first connection beacon at a first rate based upon the information handling system being in the first state. The processor further determines whether the information handling system is in a second state and directs the first wireless data communication interface to provide the first connection beacon at a second rate based upon the information handling system being in the second state.

18 Claims, 5 Drawing Sheets

VARIABLE WIRELESS BEACONING BASED ON SYSTEM CONTEXT

FIELD OF THE DISCLOSURE

This disclosure generally relates to information handling systems, and more particularly relates to variable wireless interface beaconing based on information handling system context.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a wireless data communication interface and a processor. The processor may determine that the information handling system is in a first state and direct the wireless data communication interface to provide a first connection beacon at a first rate based upon the information handling system being in the first state. The processor may further determine that the information handling system is in a second state and direct the first wireless data communication interface to provide the first connection beacon at a second rate based upon the information handling system being in the second state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
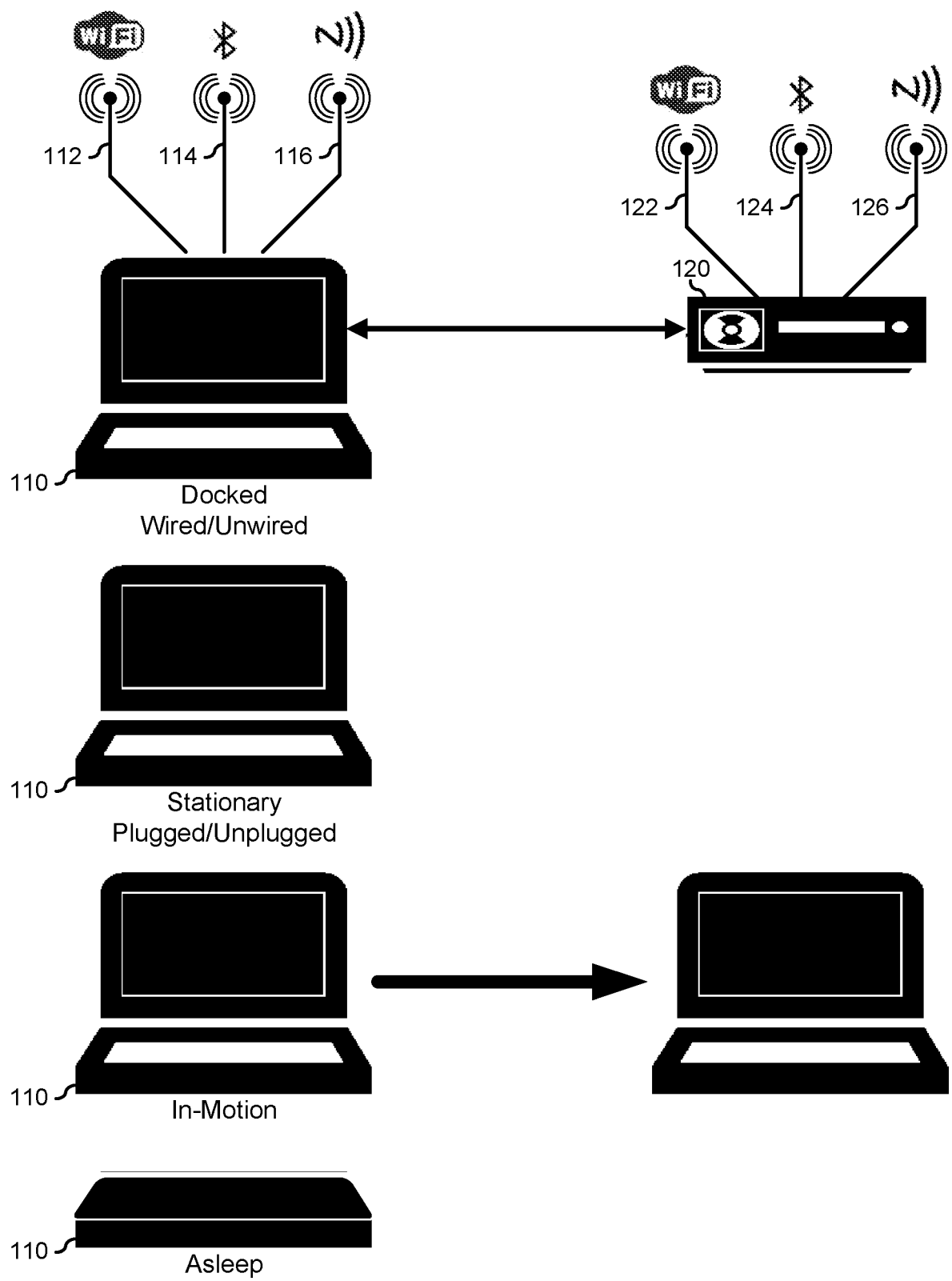
FIG. 1 illustrates a connected environment according to an embodiment of the current disclosure.

FIG. 1 illustrates a connected environment 100 that includes an information handling system 110 and a docking station 120. Connected environment 100 represents a computing environment that is characterized by highly flexible connectivity between the elements of the connected environments via broad usage of wireless interconnectivity for discovery, authentication, control, data transfer, and the like, with an emphasis on flexible compute capabilities among the information handling systems, the docking stations, and the monitors. Interconnectivity between the elements of the connected environments may include mesh networks with other elements, not shown, such as storage arrays, other information handling systems, gaming servers, and the like.

Typical wireless connectivity includes one or more wireless data communication interfaces. As such, information handling system 110 includes a WiFi interface 112, a Bluetooth interface 114, and a Near Field Communication (NFC) interface, and docking station 120 includes a WiFi interface 122, a Bluetooth interface 124, and a NFC interface 126. WiFi interfaces 112 and 122 represent wireless data communication interfaces that are provided in accordance with one or more IEEE 802.11 specification for providing wireless data connections with each other and other similarly equipped devices. Bluetooth interfaces 114 and 124 represent wireless data communication interfaces that are provided in accordance with one or more Bluetooth specification for providing wireless data connections with each other and other similarly equipped devices.

NFC interfaces 116 and 126 represent wireless data communication interfaces that are provided in accordance with one or more NFC specification for providing wireless data connections with each other and other similarly equipped devices. Here, WiFi interfaces 112 and 122 operate with a range of approximately fifty meters, Bluetooth interfaces 114 and 124 operate with a range of approximately ten meters, and NFC interfaces 116 and 126 operate with a range of approximately ten centimeters. Information handling system 110 and docking station 120 may include other wireless data communication interfaces, such as infrared (IR) data communication interfaces, closed loop field induction interfaces, and the like, as needed or desired, and any additionally data communication interfaces will be understood to be contemplated as being within the scope of the current disclosure.

Information handling system 110 is illustrated as operating in several different operational states. In a first state, information handling system 110 is docked to docking station 120. Here, information handling system 110 can be in one of several sub-states. In a first substate, information handing system 110 is docked and shares a wired data communication link with docking station 120. Here, it will be understood that information handling system 110 and docking station 120 each include a common wired data communication interface, such as an Ethernet interface, a PCIe interface, a proprietary interface or the like, for high-speed data communication between the information handling system and the docking station.

In a second sub-state, information handling system 110 is docked with docking station 120, but there is no wired data communication link between the information handling system and the docking station. Here information handling system 110 and docking station 120 will be understood to have established a wireless data communication link between at least one of WiFi interfaces 112 and 122, Bluetooth interfaces 114 and 124, and NFC interfaces 116 and 126, or any other available wireless data communication interfaces which the information handling system and the docking station have in common. In a second state, information handling system 110 is undocked, and is not in motion. Here, information handling system 110 can be in a first sub-state where the information handling system is plugged into a power source, such as an AC wall socket, or can be in a second sub-state where the information handling system is unplugged from the power source, but is operating on battery power.

In a third state, information handling system 110 is in motion. In a fourth state, information handling system 110 is in a non-operating state, such as where the information handling system is in a sleep state, a standby state, a modern standby state where various updates are pushed to the information handling system while otherwise being non-operating, or the like. While not expressly illustrated, docking station 120 can be in several different operational states including docked (wired or unwired), undocked, and non-operating states.

Devices with wireless data communication interfaces typically begin a session with another similarly equipped device by advertising its presence with a proximity beacon or other type of transmission on the associated medium (such as radio frequency band, light, etc.). When another similarly equipped device receives the advertising communication, a protocol for establishing a data communication link is followed whereby the participating devices exchange information about their respective capabilities, and negotiate the parameters of the data communication link, prior to operating to communicate data between the devices.

Thus, as used herein a beacon will be understood to refer generally to the process whereby a device with a particular wireless data communication interface advertises its presence in a particular location, in anticipation of the establishment of a data communication link with another similarly equipped device. The details of beaconing are dependent upon the particular type of wireless data communication interface, and will be specified by the relevant technical specifications for that type of wireless data communication interface. As such, the details of beacon protocols are known in the art, and will not be further described herein, except as needed to illustrate the current embodiments.

It has been understood by the inventors of the current disclosure that the active beaconing by information handling systems on the various wireless data communication interfaces is important for the operation and user experience of the information handling system. In particular, as information handling systems become more mobile, such as in the form of laptop computers, tablet devices, cellular smartphones, embedded computing systems in vehicles, and the like, the need to actively seek and maintain robust wireless data communication links to maintain Internet connectivity, access to cloud services, email and other electronic communications, and the like, becomes increasingly important. As such, in terms of connectivity, the wireless data communication interfaces within an information handling system would ideally be beaconing at all times and at a high repetition rate.

However it has been further understood that constant, high-rate, beaconing on multiple wireless data communication interfaces results in increased power and processing bandwidth consumption by the information handling system, and increased spectrum congestion in the area surrounding the information handling system, and excessive power consumption can lead to poor battery life in mobile applications, and to failure to achieve green energy compliance goals in all cases. Excessive processing bandwidth consumption can lead to poor user experience with the information handling system. Increased spectrum congestion can lead to dropped connections, dropped data, and other interference issues, especially where the user density is high, such as in a connected office environment, a connected vehicle environment, or the like.

Figure 2:
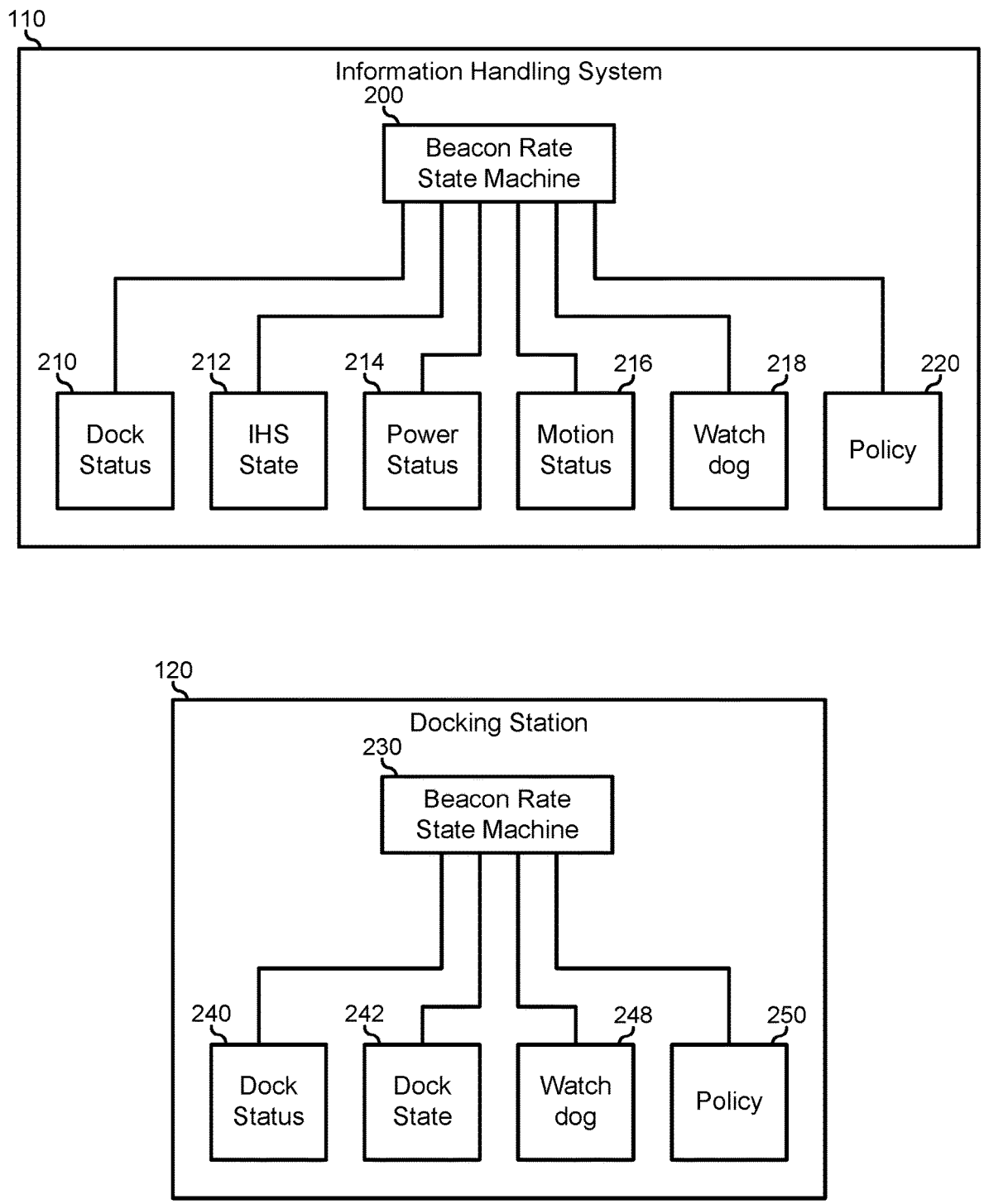
FIG. 2 illustrates an information handling system and a docking station according to an embodiment of the current disclosure.

In a particular embodiment, information handing system 110 and docking station 120 operate to selectively enable and disable beaconing, and to throttle the beaconing frequency on one or more of interfaces 112, 114, 116, 122, 124, and 126. FIG. 2 illustrates information handling system 110 and docking station 120, where the information handling system and the docking station are configured to enable and disable beaconing and to throttle the beaconing frequency based upon the decisions of respective beacon rate state machines 200 and 230. The beacon rate state machines may represent services running on an information handling system or docking station in accordance with various embodiments of the current disclosure, that optimize the enablement and throttling of the beacons based on prioritized and discernible inputs from system states and events, management parameters, and active data accumulation from various sensors, services, and processes of the information handling system and docking station.

The system events may include system scheduling tasks as may be determined by various operating system and BIOS application program interfaces (APIs). The system states may include power consumption, battery status, plug status, CPU power states, or the like. Here, beacon rate state machines 200 and 230 may operate to enforce various power budgets implemented, for example in an Advanced Configuration and Power Interface (ACPI) table or setting for information handling system 110 or docking station 120, as needed or desired. In enabling and disabling, or throttling beaconing on a particular wireless data communication interface, beacon rate state machines 200 and 230 may operate to access control registers of the various wireless data communication interfaces, system GPIO's associated with the interfaces, or the like.

Beacon rate state machines 200 and 230 may further operate to periodically enable or disable beaconing on a particular wireless data communication interface based upon the expiration of a one or more watchdog timer, as needed or desired. In a particular embodiment, beacon rate state machines 200 and 230 operate to perform packet inspection on incoming connection requests received in response to beaconing on one or more of the wireless data communication interfaces, to determine whether or not to establish a wireless data communication link with the respondent. In another embodiment, when information handling system 110 is docked with docking station 120, beacon rate state machines 200 and 230 operate to coordinate beaconing between the various wireless data communication interfaces. For example, when docked, both of WiFi interface 112 and WiFi interface 122 may not need to be active, as one of the WiFi interfaces may suffice to maintain a wireless data communication link with an access point for Internet service or the like.

As such, information handling system 110 includes beacon rate state machine 200 with state inputs including a dock status indication 210, an information handling system state indication 212, a power status indication 214, a motion status indication 216, a watchdog timer indication 218, and a policy indication 220. Dock status indication 210 provides an indication to beacon rate state machine 200 as to whether or not information handling system 110 is docked or undocked. Information handling system state indication 212 an indication to beacon rate state machine 200 as to the current operating state of information handling system 110, including processor operating states, system states (such as, S0-S4, Modern Standby, etc.), and other operating state information.

Power status indication 214 provides an indication to beacon rate state machine 200 as to the power status of information handing system 100, including whether or not the information handling system is plugged into a power source or is operating on an internal battery, battery status and charge level information, and the like. Motion status indication 216 provides an indication to beacon rate state machine 200 as to whether or not information handling system 110 is currently in motion or is stationary, or, when in motion, whether the speed of motion is above or below a particular motion threshold. Watchdog timer indication 218 provides an indication to beacon rate state machine 200 as to whether or not one or more watchdog timers has expired. Policy indication 220 provides beacon rate state machine 200 with policy instructions as to how to respond based upon the various other inputs to the beacon rate state machine.

Similarly, docking station 120 includes beacon rate state machine 500 with state inputs including a dock status indication 240, an docking station state indication 442, a watchdog timer indication 248, and a policy indication 250. Dock status indication 210 provides an indication to beacon rate state machine 230 as to whether or not information handling system 110 is docked or undocked. Docking station state indication 232 an indication to beacon rate state machine 230 as to the current operating state of docking station 120, including processor operating states, system states (such as S0-S4, Modern Standby, etc.), and other operating state information. Watchdog timer indication 238 provides an indication to beacon rate state machine 230 as to whether or not one or more watchdog timers has expired. Policy indication 250 provides beacon rate state machine 230 with policy instructions as to how to respond based upon the various other inputs to the beacon rate state machine.

Exemplary cases may include where information handling system is docked to docking station 120 and is connected to the docking station via a wired data communication interface. Here, power consumption in information handling system 110 may not be an issue of concern, due to the fact that the information handling system receives power from docking station 120. Here, beacon rate state machines 200 and 230 may coordinate to disable all but one of each type of interface 112, 114, 116, 122, 124, and 126 to decongest the airwaves, but may keep the one of each type of interface beaconing at a maximum rate.

On the other hand, where information handling system 110 is connected wirelessly to docking station 120, and the information handling system is operating on battery power, beacon rate state machines 200 and 230 may operate to ensure that the one of each type of interface consists of interfaces 122, 124, and 126, that is, the interfaces on docking station 120, because the docking station is not power limited, or, where one or more of interfaces 112, 124, and 126 are enabled, the beacon state machines may direct those interfaces to beacon at a throttled rate. In other exemplary cases where information handling system 110 is stationary, beacon rate state machine 200 may operate to lower the beaconing rate for one or more of interfaces 112, 114, and 116, with the understanding that, being stationary, the information handling system will not experience rapid changes in the environment, in terms of other devices that might seek to establish wireless data communication links with the information handling system.

On the other hand, when information handling system 110 is in motion, a higher rate of beaconing may be desired. However, such a higher rate of beaconing may be offset by a low battery indication or a high battery consumption rate indication. Finally, when information handling system 110 is asleep, all beaconing may be disabled, or, if the information handling system is in a Modern Sleep state, one or more of interfaces 112, 114, and 116 may be disabled for long periods, but may yet be enabled for short durations in order to remain up to date with messages, e-mails, alerts, and the like.

Figure 3:
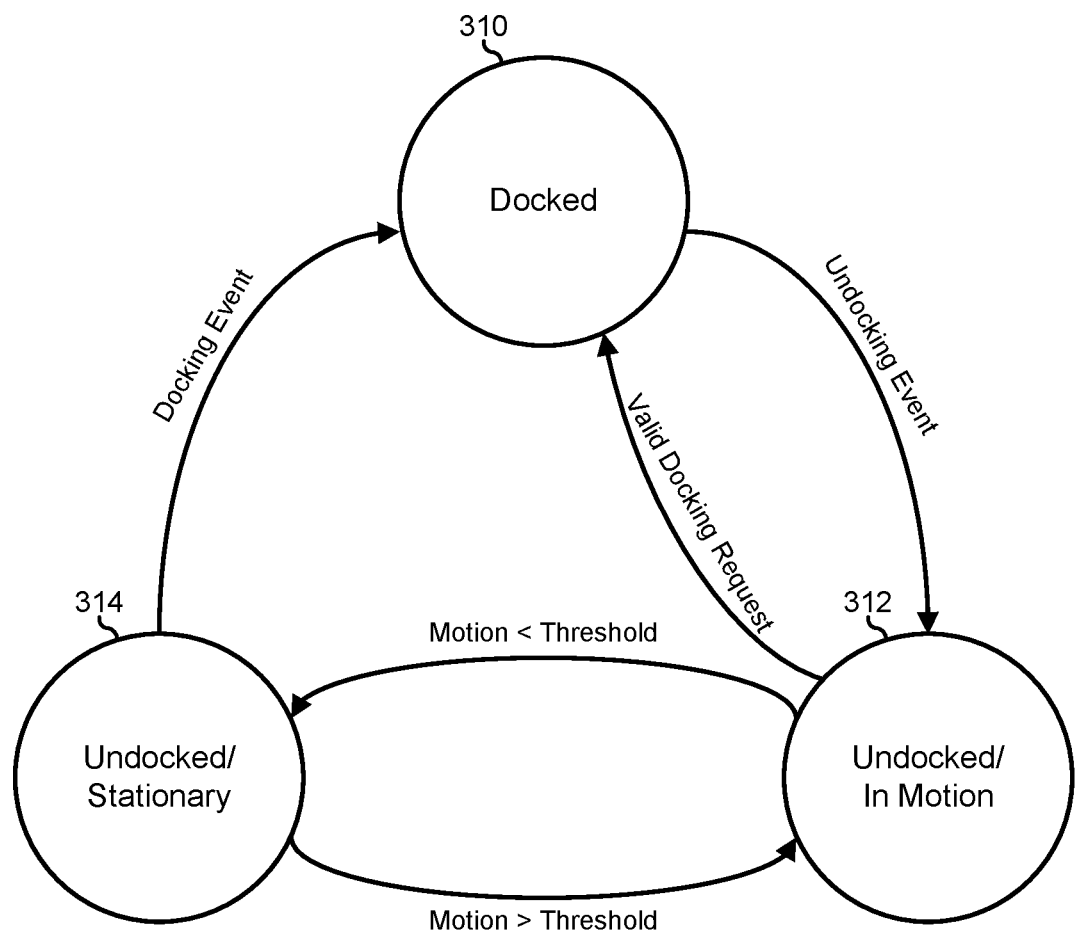
FIG. 3 illustrates a docking rate state machine according to an embodiment of the current disclosure.

FIG. 3 illustrates an exemplary docking rate state machine 300 for a particular device such as an information handling system or a docking station. Docking rate state machine 300 includes a docked state 310, an undocked and in motion state 312, and an undocked and stationary state 314. In each state 310, 312, and 314, docking state machine 300 operates to determine the beaconing rates for the various wireless data communication interfaces in the associated device based upon inputs as described above with respect to FIG. 2. In the docked state 310, may operate to select the beaconing rates in accordance with the following pseudocode:

```
Entry//Discovery Beaconing Stationary State Initialize
    Set Beacon_Rate_event_Timer" (BRET) to AVG(Min,
        Max) from Policy_File;
    Issue Proximity Beacon Advertisement;
Do//Event Driven Beacon Throttle
    BRET_Expiry_Event ( ) {
        Issue Proximity Beacon Advertisement;
        Get_New_Beacon_Rate (&BRET, 0, Docked_Station-
            ary); //Throttle Beacon Rate
        if ((BRET==0)//Mine==0, Disable Proximity Beacon-
            ing
            Disable_Beacon_Timer
        else
            Set_Beacon_Rate (BRET)
    }
    Motion_Event ( ) {
        if (Motion_Detected && Distance_To_Dock exceeds
            Undock Threshold) {
            Undocking_Tasks ( );
            Exit (Docked_InMOtion);}
        else
            Ignore_Motion//Still In "Docked" Range
```

```
Undock_Event ( ){//Docking connection dropped or
    request to drop
    Undocking_Tasks ( );
    Exit(Undocked_Stationary)
  }
Exit ( )//Process Next State Transition
  Process_New_State: [Undocked_InMOtion, Undocked_
    Stationary]
```

In the undocked and in motion state 512, may operate to select the beaconing rates in accordance with the following pseudocode:

```
Entry/
  Enable_Proximity_Beacon_Timer;
  Set_Beacon_Rate_Event_Timer" (BRET) to AVG(Min,
    Max) from Policy_File;
  Issue Proximity Beacon Advertisement;
  Get_Motion_Rate (&PrevMotionRate);
Do//Event Driven Beacon Throttle
  BRET_Expiry_Event ( ){
    Issue Proximity Beacon Advertisement;
    Get_New_Beacon_Rate (&BRET, 0, Docked_Station-
      ary); //New Beacon Rate
    if ((BRET==0)//Mine==0, Disable Proximity Beacon-
      ing
    Disable_Beacon_Timer
  }//End BRET_Expiry_Event
  Motion_Event ( ){//Speed up or slow down beacon rate
    Get_Motion_Rate (&NewMotionRate);
    if (NewMotionRate<MinMotionThreshold) {
      Exit (Undocked_Stationary);}
    else (
      Get_New_Beacon_Rate (&BRET, PrevMotionRate,
        Undocked_InMotion);
      Set_Beacon_Rate (BRET);
    }
  }//End Motion_Event
  Dock_Connect_Event ( ){//Valid Dock Request (In
    Range)
    Intiate_Docking_Tasks ( );
    Exit (Docked_Stationary)
  }
Exit{)//Process Next State Transition
  Process_New_State: [Docked_Stationary, Undocked_S-
    tationary]
```

In the undocked and stationary state 514, may operate to select the beaconing rates in accordance with the following pseudocode:

```
Entry/
  Enable_Proximity_Beacon_Timer;
  Set_Beacon_Rate_Event_Timer" (BRET) to AVG(Min,
    Max) from Policy_File;
  Issue Proximity Beacon Advertisement;
  Get_Motion_Rate (&PrevMotionRate);
Do//Event Driven Beacon Throttle
  BRET_Expiry_Event ( ) {
    Issue Proximity Beacon Advertisement;
    Get_New_Beacon_Rate (&BRET, 0, Docked_Station-
      ary); //New Beacon Rate
    if ((BRET==0)//Mine==0, Disable Proximity Beacon-
      ing
    Disable_Beacon_Timer
  }//End BRET_Expiry_Event
  Motion_Event ( ){//Speed up or slow down beacon rate
    Get_Motion_Rate (&NewMotionRate);
    if (NewMotionRate<MinMotionThreshold) {
      Ignore_Motion//Remain in Undocked_Stationary
        statte
    else (
      Get_New_Beacon_Rate (&BRET, PrevMotionRate,
        Undocked_InMotion);
      Set_Beacon_Rate (BRET);
      Exit (Undocked_InMotion);
    }
  }//End Motion_Event
  Dock_Connect_Event ( ) {//Valid Dock Request (In
    Range)
    Intiate_Docking_Tasks ( );
    Exit (Docked_Stationary)
  }
Exit{)//Process Next State Transition
  Process_New_State: [Undocked_InMotion, Docked_Sta-
    tionary]
```

Here, when in docked state 310 an undocking event triggers a transition to undocked and in motion state 312. Then, when in undocked and in motion state 314, a docking request triggers a transition back to docked state 310, and a detection of motion that is less than a motion threshold triggers a transition to undocked and stationary state 314. When in undocked and stationary state 314, a detection of motion that is greater than the motion threshold triggers a transition to undocked and in motion state 312, and a docking request triggers a transition to docked state 310.

Figure 4:
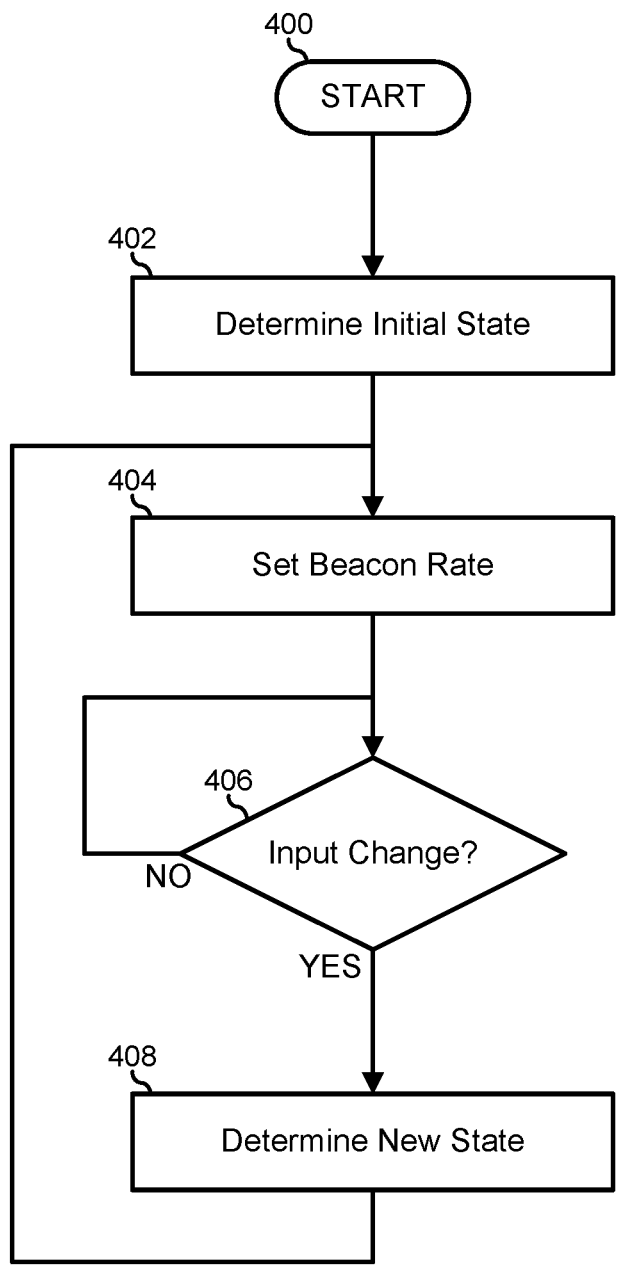
FIG. 4 is a flowchart illustrating a method for providing variable wireless data communication interface beaconing based on system context information in an information handling system according to an embodiment of the current disclosure.

FIG. 4 illustrates a method for providing variable wireless data communication interface beaconing based on system context information in an information handling system, starting at block 400. An initial state of the information handling system is determined in block 402, and a beacon rate for a wireless data communication interface is set based upon the initial state of the information handling system in block 404. A decision is made as to whether or not an input has changed the initial state of the information handling system in decision block 406. If not, the "NO" branch of decision block 406 is taken and the method loops through decision block 406 until an input changes the initial state of the information handling system. When an input changes the initial state of the information handling system, the "YES" branch of decision block 406 is taken, a new state of the information handling system is determined in block 408, and the method returns to block 404 where the beacon rate for a wireless data communication interface is set based upon the new state of the information handling system.

Figure 5:
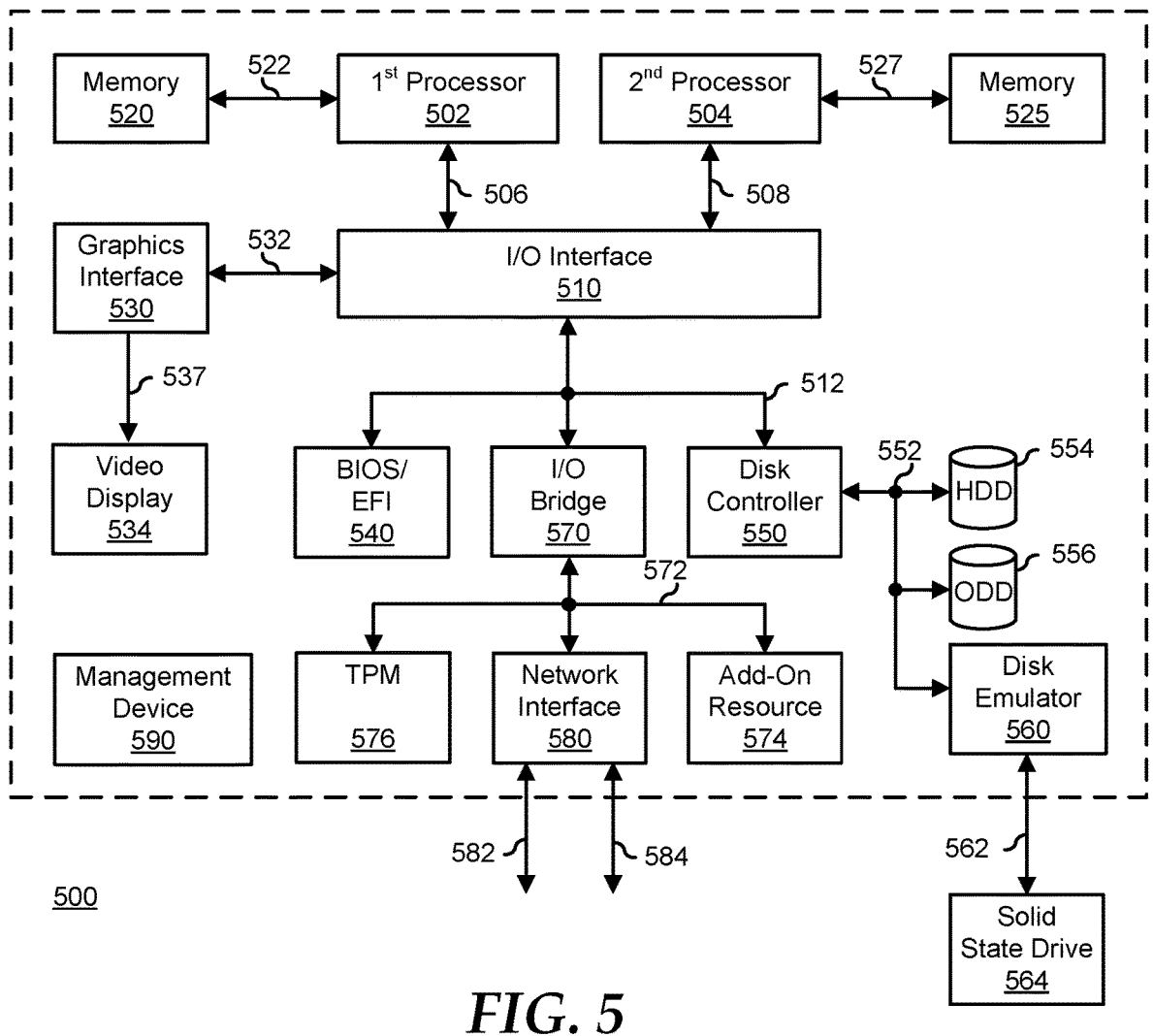
FIG. 5 is a block diagram illustrating a generalized information handling system according to another embodiment of the current disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price.

Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595.

Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB)

mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first wireless data communication interface; and
   a processor configured to:
      determine that the information handling system is in a first state;
      direct the first wireless data communication interface to provide a first connection beacon at a first rate based upon the information handling system being in the first state;
      determine that the information handling system is in a second state;
      direct the first wireless data communication interface to provide the first connection beacon at a second rate based upon the information handling system being in the second state;
      determine that the information handling system is in a third state; and
      disable the first connection beacon based upon the information handling system being in the third state.

2. The information handling system of claim 1, further comprising:
   a second wireless data communication interface;
   wherein the processor is further configured to direct the second wireless data communication interface to provide a second connection beacon at a third rate based upon the information handling system being in the first state and in the second state.

3. The information handling system of claim 1, wherein the first state includes the information handling system being docked to a docking station, and wherein the second state includes the information handling system being undocked from the docking station.

4. The information handling system of claim 1, further comprising:
   a wired data communication interface, wherein the third state includes the information handling system being docked to the docking station and being coupled to the docking station via the wired data communication interface.

5. The information handling system of claim 1, wherein the first state includes the information handling system being plugged into a power source, and wherein the second state includes the information handling system operating on battery power.

6. The information handling system of claim 1, wherein the first state includes the information handling system being stationary, and wherein the second state includes the information handling system being in motion.

7. The information handling system of claim 1, wherein the first state includes the information handling system being in a first system sleep state, and wherein the second state includes the information handling system being in a second system sleep state.

8. The information handling system of claim 1, wherein the first state includes the information handling system operating prior to an expiration of a watchdog timer, and wherein the second state includes the information handling system operating after the expiration of the watchdog timer.

9. The information handling system of claim 1, wherein the first data communication interface comprises one of a WiFi interface, a Bluetooth interface, and a near field communication interface.

10. A method, comprising:
    determining, by a processor, that an information handling system is in a first state;
    directing a first wireless data communication interface of the information handling system to provide a first connection beacon at a first rate based upon the information handling system being in the first state;
    determining that the information handling system is in a second state;
    directing the first wireless data communication interface to provide the first connection beacon at a second rate based upon the information handling system being in the second state;
    determining that the information handling system is in a third state; and
    disabling the first connection beacon based upon the information handling system being in the third state.

11. The method of claim 10, further comprising:
    directing a second wireless data communication interface of the information handling system to provide a second connection beacon at a third rate based upon the information handling system being in the first state and in the second state.

12. The method of claim 10, wherein the first state includes the information handling system being docked to a docking station, and wherein the second state includes the information handling system being undocked from the docking station.

13. The method of claim 10, wherein the third state includes the information handling system being docked to a docking station and being coupled to the docking station via a wired data communication interface.

14. The method of claim 10, wherein the first state includes the information handling system being plugged into a power source, and wherein the second state includes the information handling system operating on battery power.

15. The method of claim 10, wherein the first state includes the information handling system being stationary, and wherein the second state includes the information handling system being in motion.

16. The method of claim 10, wherein the first state includes the information handling system being in a first system sleep state, and wherein the second state includes the information handling system being in a second system sleep state.

17. The method of claim 10, wherein the first state includes the information handling system operating prior to an expiration of a watchdog timer, and wherein the second state includes the information handling system operating after the expiration of the watchdog timer.

18. A docking station for docking an information handling system, the docking station comprising:
    a first wireless data communication interface; and
    a processor configured to:
        direct the first wireless data communication interface to provide a first connection beacon at a first rate if the docking station is in a first state;
        direct the first wireless data communication interface to provide the first connection beacon at a second rate if the docking station is in a second state; and
        disable the first connection beacon if the docking station is in a third state.

* * * * *